(12) United States Patent
Lee

(10) Patent No.: US 8,873,897 B2
(45) Date of Patent: Oct. 28, 2014

(54) OPTICAL FIBER MULTI-WAVELENGTH FILTER AND METHOD OF CONTROLLING WAVELENGTH OF SPECTRUM USING THE SAME

(75) Inventor: YongWook Lee, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 37 days.

(21) Appl. No.: 13/331,659

(22) Filed: Dec. 20, 2011

(65) Prior Publication Data

US 2012/0328230 A1 Dec. 27, 2012

(30) Foreign Application Priority Data

Jun. 27, 2011 (KR) .................. 10-2011-0062528

(51) Int. Cl.
*G02B 6/00* (2006.01)
*G02B 6/27* (2006.01)

(52) U.S. Cl.
CPC ........................ *G02B 6/27* (2013.01)
USPC ......................................... 385/11

(58) Field of Classification Search
USPC ......................................... 385/11
See application file for complete search history.

(56) References Cited

U.S. PATENT DOCUMENTS

| | | | | |
|---|---|---|---|---|
| 3,625,589 | A * | 12/1971 | Snitzer | 385/4 |
| 5,063,290 | A * | 11/1991 | Kersey | 250/227.17 |
| 5,377,283 | A * | 12/1994 | Blake et al. | 385/11 |
| 5,486,916 | A * | 1/1996 | Michal et al. | 356/483 |
| 6,201,237 | B1 * | 3/2001 | Berkey et al. | 250/227.14 |
| 6,650,821 | B1 * | 11/2003 | Koyano et al. | 385/136 |
| 2002/0015373 | A1* | 2/2002 | Novotny et al. | 369/71 |
| 2004/0086227 | A1* | 5/2004 | Bae et al. | 385/37 |
| 2009/0017395 | A1* | 1/2009 | Ariyoshi et al. | 430/111.4 |

FOREIGN PATENT DOCUMENTS

JP 04313068 A * 11/1992

OTHER PUBLICATIONS

Choi, D.H. et al. "Current-Controlled Wavelength-Tunable Fiber Comb Filter based on Polarization-Diversity Loop Configuration" *Journal of the Korean Institute of Illuminating and Electrical Installation Engineers*, Dec. 31, 2010, 24(12):33-37.

* cited by examiner

*Primary Examiner* — Charlie Peng
*Assistant Examiner* — Mary El Shammaa
(74) *Attorney, Agent, or Firm* — Saliwanchik, Lloyd & Eisenschenk

(57) ABSTRACT

An optical fiber multi-wavelength filter based on a polarization-diversity loop configuration within which polarization-maintaining fibers are contained with some optical elements is disclosed. The filter includes a coil heater adjacent to polarization-maintaining fibers. An ambient temperature of the polarization-maintaining fiber is controlled by adjusting a current applied to the coil heater.

18 Claims, 4 Drawing Sheets

OPTICAL FIBER MULTI-WAVELENGTH FILTER AND METHOD OF CONTROLLING WAVELENGTH OF SPECTRUM USING THE SAME

CROSS-REFERENCE TO RELATED APPLICATION

This application claims the benefit under 35 U.S.C. §119 of Korean Patent Application No. 10-2011-0062528, filed Jun. 27, 2011, which is hereby incorporated by reference in its entirety.

BACKGROUND

1. Field of the Invention

The disclosure relates to an optical fiber multi-wavelength filter and a method of controlling a wavelength of an output spectrum of the filter, and more particularly, to an optical fiber multi-wavelength filter based on a polarization-diversity loop configuration capable of tuning a wavelength of an output spectrum and a method of controlling a wavelength of an output spectrum of the filter.

2. Description of the Related Art

In an optical communication system, multi-wavelength light sources or all-fiber wavelength-selective filters have received much attention as main components to meet the increased bandwidth demands.

Among these components, an optical fiber filter is used as a core component for wavelength routing in a wavelength-division-multiplexing network.

In the optical fiber filter, it is important to accurately adjust the position of an absolute wavelength by an ITU-grid standard wavelength in the wavelength-division-multiplexing network while maintaining the wavelength spacing of the filter.

In particular, the optical fiber multi-wavelength filter has been heavily researched because the filter is easy to design and use.

To control an absolute channel wavelength of the optical fiber multi-wavelength filter, a mechanical method and a polarization control method have been proposed.

For an optical fiber multi-wavelength filter that forms an interference spectrum using a polarization-maintaining fiber, wavelength tuning of the filter channel has been accomplished by the mechanical method of applying strain to the polarization-maintaining fiber to change the birefringence, or by the polarization control method of adjusting a phase difference between principal polarization components.

However, the mechanical method may deteriorate the durability of the polarization-maintaining fiber over repeated operations.

Also, the polarization control method has a disadvantage of being inapplicable to wavelength tuning in a higher-order filter having sharper edge and flatter passband.

BRIEF SUMMARY

Exemplary embodiments provide an optical fiber multi-wavelength filter based on a polarization-diversity loop configuration capable of a tuning a wavelength of an output spectrum and a method of controlling a wavelength of an output spectrum of the filter.

According to an exemplary embodiment, an optical fiber multi-wavelength filter based on a polarization-diversity loop configuration within which polarization-maintaining fibers are contained includes a coil heater adjacent to the polarization-maintaining fiber, wherein an ambient temperature of the polarization-maintaining fiber is controllable by a current applied to the coil heater.

In an exemplary embodiment, the polarization-diversity loop configuration may be configured to include a polarization beam splitter and a polarization controller.

In an exemplary embodiment, the polarization controller may be configured to include a half-wave plate and a quarter-wave plate.

In an exemplary embodiment, the coil heater may be configured to include a coil which is wound several times around the polarization-maintaining fiber, and the polarization-maintaining fiber may be uncovered at a portion where the coil is provided.

In an exemplary embodiment, the coil may be composed of materials including at least one of, but not limited to, nickel (Ni), chrome (Cr), carbon (C), quartz ($SiO_2$), stainless steel, Teflon, titanium (Ti), copper (Cu), iron (Fe), aluminum (Al), zinc (Zn), brass (Bs), mica, and alloys thereof.

In an exemplary embodiment, the polarization-maintaining fiber may include at least one of a bow tie type polarization-maintaining fiber, a panda type polarization-maintaining fiber, an elliptical core type polarization-maintaining fiber, an elliptical cladding type polarization-maintaining fiber, and a polarization-maintaining photonic-crystal fiber.

According to another exemplary embodiment, a method of controlling a wavelength of an output spectrum of an optical fiber multi-wavelength filter including a polarization-maintaining fiber and a coil heater adjacent to the polarization-maintaining fiber includes tuning a wavelength of a filter output spectrum by controlling an ambient temperature of the polarization-maintaining fiber through a current applied to the coil heater.

In an exemplary embodiment, the polarization-maintaining fiber may be connected with other optical elements in a polarization-diversity loop configuration.

In an exemplary embodiment, the coil heater may include a coil wound several times around the polarization-maintaining fiber, and the polarization-maintaining fiber may be uncovered at a portion where the coil is provided.

In an exemplary embodiment, the ambient temperature around the polarization-maintaining fiber may be controlled, and thus the birefringence of the polarization-maintaining fiber may be adjusted, thereby continuously tuning a peak or dip wavelength of the filter output spectrum.

BRIEF DESCRIPTION OF THE DRAWINGS

Exemplary embodiments are described in further detail below with reference to the accompanying drawings. It should be understood that various aspects of the drawings may have been exaggerated for clarity.

DETAILED DESCRIPTION

Figure 1:
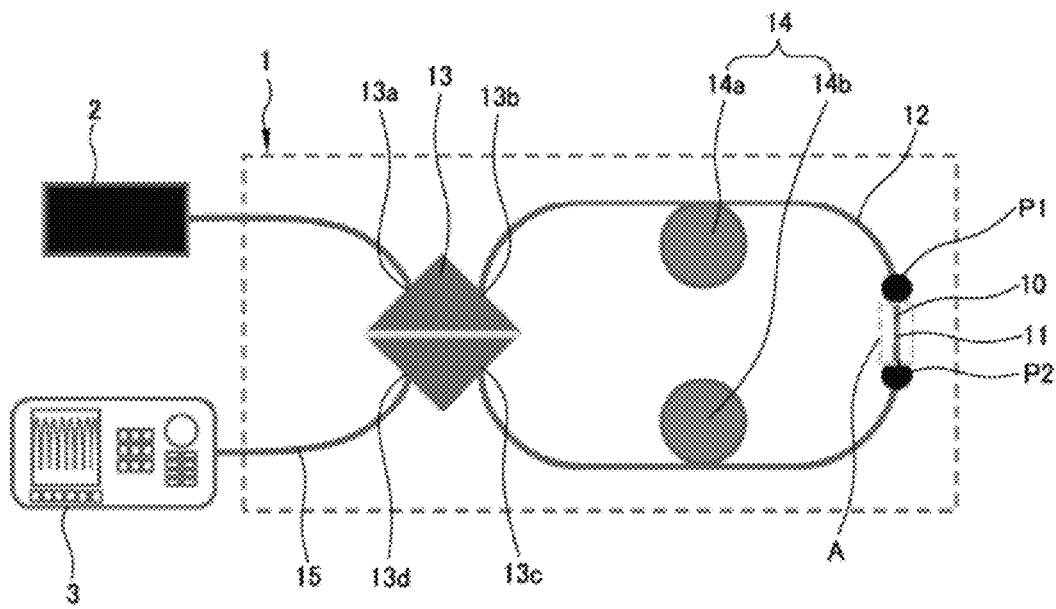
FIG. 1 is a conceptual diagram illustrating an optical fiber multi-wavelength filter configured by connecting a polarization-maintaining fiber with some optical elements in polarization-diversity loop configuration.

Various exemplary embodiments will now be described more fully with reference to the accompanying drawings in which some exemplary embodiments are shown. In the drawings, the thicknesses of layers and regions may be exaggerated for clarity. Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An optical fiber multi-wavelength filter 1 according to an exemplary embodiment will now be described with reference to FIG. 1 and FIG. 2. Note that an optical fiber multi-wavelength filter is also referred to herein simply as a "filter".

FIG. 1 is a conceptual diagram illustrating an optical fiber multi-wavelength filter configured for a polarization-maintaining fiber to be connected with some optical elements in a polarization-diversity loop configuration. FIG. 2 is a conceptual diagram illustrating a coil heater formed on a polarization-maintaining fiber to implement wavelength tuning of the optical fiber multi-wavelength filter by adjusting a current applied to the coil heater. FIG. 2 is an enlarged view of a portion A of FIG. 1.

Referring to FIG. 1, an optical fiber multi-wavelength filter 1 is configured for the polarization-maintaining fiber 10 to be connected with some optical elements in the polarization-diversity loop configuration, and includes a coil heater 11 adjacent to the polarization-maintaining fiber 10. The polarization-maintaining fiber 10 can be connected to a single-mode optical fiber 12 of a closed-circuit form at two fusion splice points P1 and P2. This single-mode optical fiber 12 allows various optical components such as a polarization beam splitter 13 and a polarization controller 14 to be connected to each other, thereby forming the polarization-diversity loop configuration.

The polarization-maintaining fiber 10 is used as a birefringence component for forming an interference spectrum of the filter. Examples of the polarization-maintaining fiber may include a bow tie type polarization-maintaining fiber, a panda type polarization-maintaining fiber, an elliptical core type polarization-maintaining fiber, an elliptical cladding type polarization-maintaining fiber, a polarization-maintaining photonic-crystal fiber, and any combination thereof, but are not limited thereto.

The coil heater 11 is provided adjacent to the polarization-maintaining fiber 10 to adjust an ambient temperature of the polarization-maintaining fiber 10 by applying a current to the coil. The details of the polarization-maintaining fiber 10 and the coil heater 11 will be described later with reference to FIG. 2.

The single-mode optical fiber 12 connects various optical components each other, and may be an optical fiber having a cut-off frequency enabling single-mode light propagation.

The polarization beam splitter 13 is used to implement a polarization-diversity loop configuration-based optical fiber multi-wavelength filter 1 by splitting incident light into two orthogonal polarization components.

The polarization controller 14 may include a half-wave plate 14a and a quarter-wave plate 14b. The polarization controller 14 is configured to adjust the visibility of a multi-wavelength (interference) spectrum of the filter.

The optical fiber multi-wavelength filter 1 according to an exemplary embodiment may be connected to a broadband light source 2 and an optical spectrum analyzer 3 through the polarization beam splitter 13. The polarization beam splitter 13 may be connected to the broadband light source 2 and the optical spectrum analyzer 3 through the single-mode optical fiber 15.

A first terminal 13a of the polarization beam splitter 13 is connected to the broadband light source 2 and used as an input of the optical fiber multi-wavelength filter 1. A second terminal 13b of the polarization beam splitter 13 outputs a vertically polarized component of light input to the first terminal 13a. A third terminal 13c of the polarization beam splitter 13 outputs a horizontally polarized component of light input to the first terminal 13a. A fourth terminal 13d of the polarization beam splitter 13 is used as an output of the optical fiber multi-wavelength filter 1 and connected to the optical spectrum analyzer 3.

Meanwhile, an ambient temperature of the polarization-maintaining fiber 10 may be measured by a thermocouple (not shown). The changes in output spectrum of the filter depending on the changes in ambient temperature of the polarization-maintaining fiber 10 may be measured using the broadband light source 2, the optical spectrum analyzer 3, and the thermocouple. On the other hand, the ambient temperature of the polarization-maintaining fiber 10 may be also measured by methods other than the thermocouple.

Figure 2:
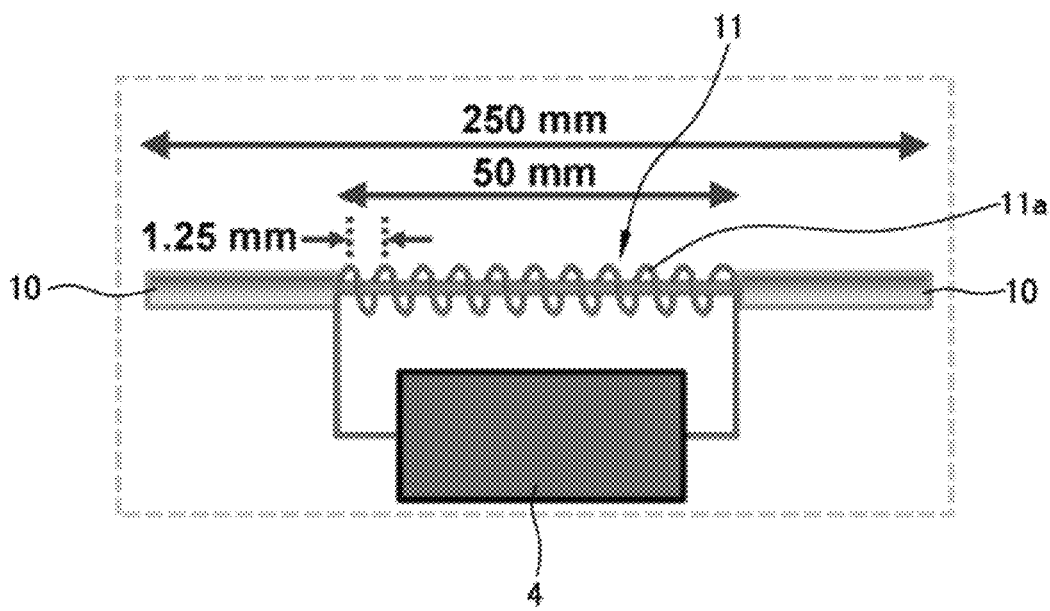
FIG. 2 is a conceptual diagram illustrating a coil heater formed on a polarization-maintaining fiber to implement wavelength tuning of the optical fiber multi-wavelength filter by adjusting a current applied to the coil heater.

Referring to FIG. 2, the coil heater 11 includes a coil 11a which is wound several times around the polarization-maintaining fiber 10. The coil 11a may be powered from a current source 4 connected thereto. The coil may be composed of a material including at least one of, but not limited to, nickel (Ni), chrome (Cr), carbon (C), quartz ($SiO_2$), stainless steel, Teflon, titanium (Ti), copper (Cu), iron (Fe), aluminum (Al), zinc (Zn), brass (Bs), mica, and alloys thereof.

In a particular experimental example, a coil 11a may be formed by removing a 50 mm length of polymer coating in a center portion of a 250 mm-long polarization-maintaining fiber 10, and then winding an enameled wire having a diameter of 0.07 mm around the polarization-maintaining fiber 10 where the coating is removed, 40 times at an interval of 1.25 mm. The wavelength of the output spectrum of the optical fiber multi-wavelength filter 1 may be tuned by adjusting the birefringence of the polarization-maintaining fiber 10. The birefringence of the polarization-maintaining fiber 10 may be adjusted by changing the ambient temperature of the polarization-maintaining fiber 10 through applying a current to the coil 11a using the current source 4 connected across the coil 11a.

A method of controlling a wavelength of an output spectrum of the optical fiber multi-wavelength filter according to an exemplary embodiment will now be described.

The wavelength of the filter output spectrum may be controlled using the coil heater 11 adjacent to the polarization-maintaining fiber 10, as shown in FIG. 2. The wavelength of the filter output spectrum may be tuned by adjusting the ambient temperature of the polarization-maintaining fiber 10 through varying a current applied to the coil heater 11.

Specifically, when a current is applied from the current source 4 to the coil heater 11 including the coil 11a wound around the polarization-maintaining fiber 10, the ambient temperature of the polarization-maintaining fiber 10 is changed by Joule heating of the coil 11a. The change in the ambient temperature causes the filter transmission spectrum (output spectrum) to change. That is, a peak or dip wavelength in the transmission spectrum may be continuously tuned.

In accordance with the optical fiber multi-wavelength filter and the method of controlling a wavelength of an output spectrum of the filter, the channel wavelength of the filter can be tuned by adjusting a current applied to the coil heater 11. The filter and method have the advantages of a simple configuration, ease of operation, and high reliability compared to wavelength control by a voltage. Furthermore, the durability of the filter is excellent. With the coil heater 11, it is possible to linearly tune the wavelength through uniform heat transfer, as described later.

Results of an experiment on an optical fiber multi-wavelength filter and a method of controlling a wavelength of an output spectrum of the filter according to an exemplary embodiment will now be described.

Figure 3:
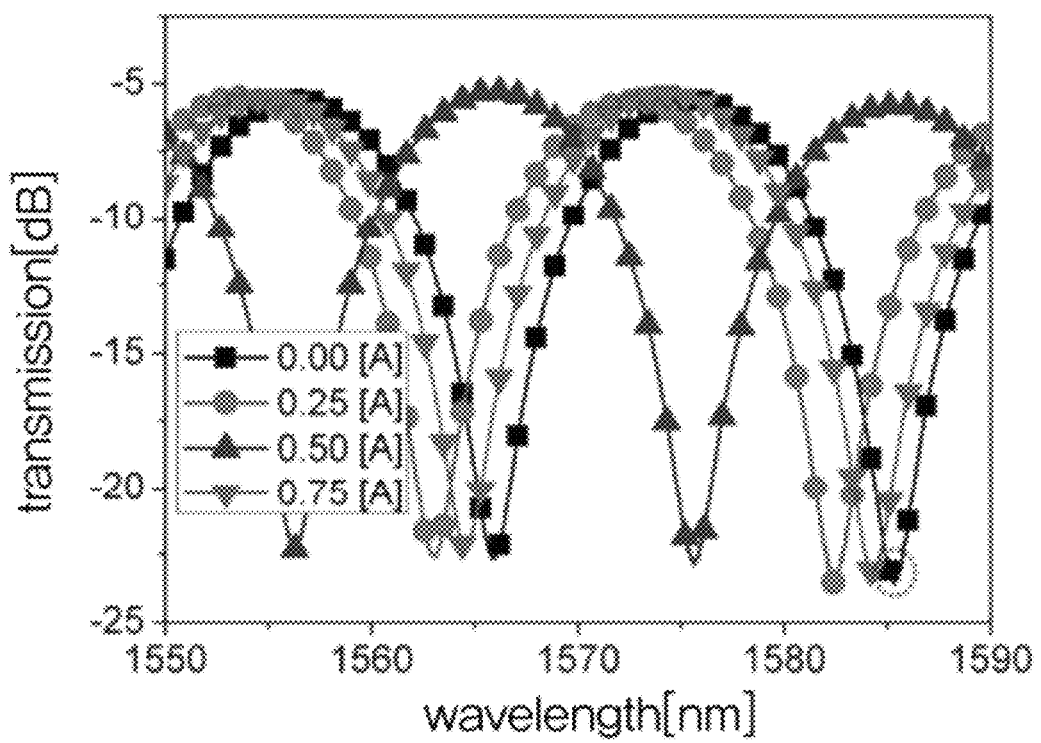
FIG. 3 is a graph showing results of measuring changes of the filter transmission spectrum with respect to a few applied currents.

FIG. 3 is a graph showing results of measuring changes of the filter transmission spectrum with respect to a few applied currents.

Resolution bandwidth of the optical spectrum analyzer 3 used in the measurement was 0.07 nm and the transmission spectrum of the filter was observed in the wavelength range from 1550 nm to 1590 nm. As can be seen from the graph, as the current increased, the positions of spectral dips shifted toward shorter wavelengths. This shift toward shorter wavelengths, or, blue shift, means that the wavelength interval (spacing) of the interference spectrum decreases. Denoting the length and birefringence of the polarization-maintaining fiber 10 used in the filter as L and B, respectively, the wavelength interval $D1(=l_2-l_1)$ of the filter may be expressed as Equation 1 below. Here, $l_1$ and $l_2$ are wavelengths of two adjacent spectral dips that determine the wavelength interval.

$$D1 = l_2 l_1 / BL \quad (1)$$

That is, because the wavelength interval of the filter is nearly inversely proportional to the birefringence, the reduction of the wavelength interval means that the birefringence of the polarization-maintaining fiber 10 is increased by the heat generated due to the increase of the applied current. In FIG. 3, during the change of the input current from 0 A to 0.75 A, the transmission spectrum shifted by about one cycle, and the wavelength interval of the filter was measured to be 19.36 nm. Therefore, it is possible to tune the channel wavelength of the filter by controlling the birefringence of the polarization-maintaining fiber 10 by changing the ambient temperature of the polarization-maintaining fiber 10 through the adjustment of the applied current.

Figure 4:
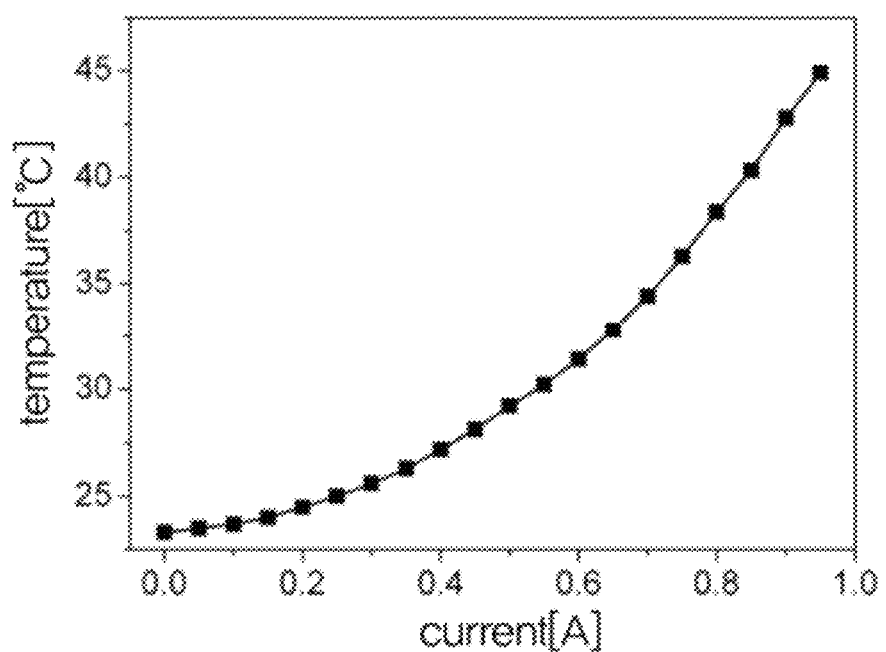
FIG. 4 is a graph showing temperature changes around a polarization-maintaining fiber with respect to the applied current.

FIG. 4 is a graph showing results of measuring changes in ambient temperature of the polarization-maintaining fiber caused by the applied current.

This graph shows temperature changes due to the increase of the applied current measured in the thermocouple provided adjacent to the polarization-maintaining fiber 10 in the filter. As the current applied to the coil 11a composed of enameled wires increased, heat generated in the coil 11a by Joule heating increased, and thus the ambient temperature of the polarization-maintaining fiber 10 increased.

Figure 5:
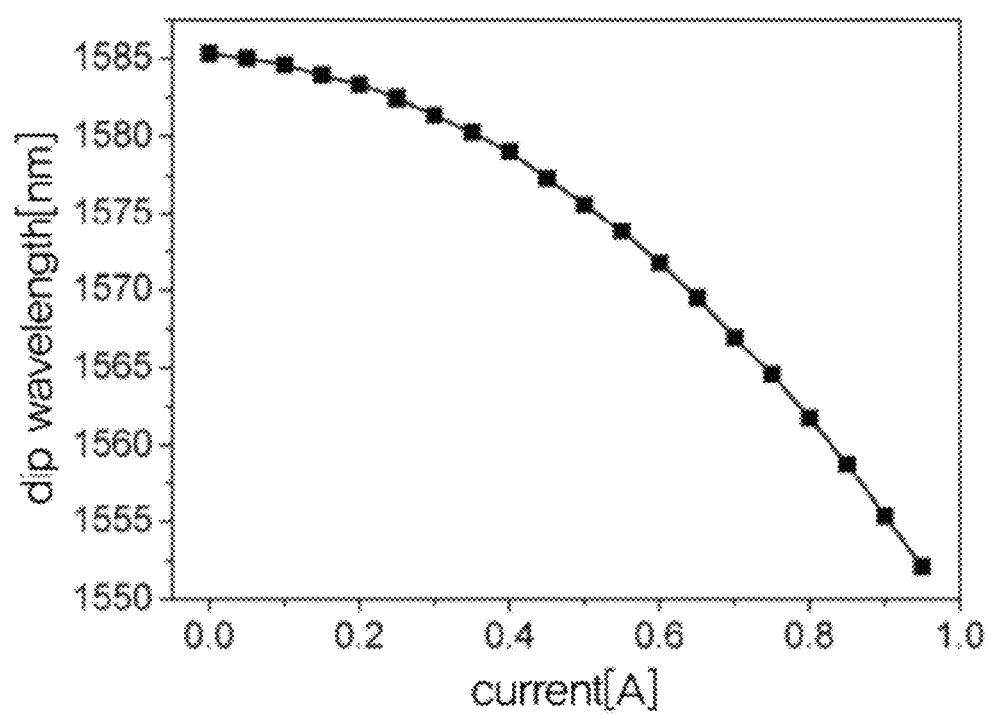
FIG. 5 is a graph showing results of measuring wavelength changes of a particular dip in the filter transmission spectrum with respect to the applied current.
Figure 6:
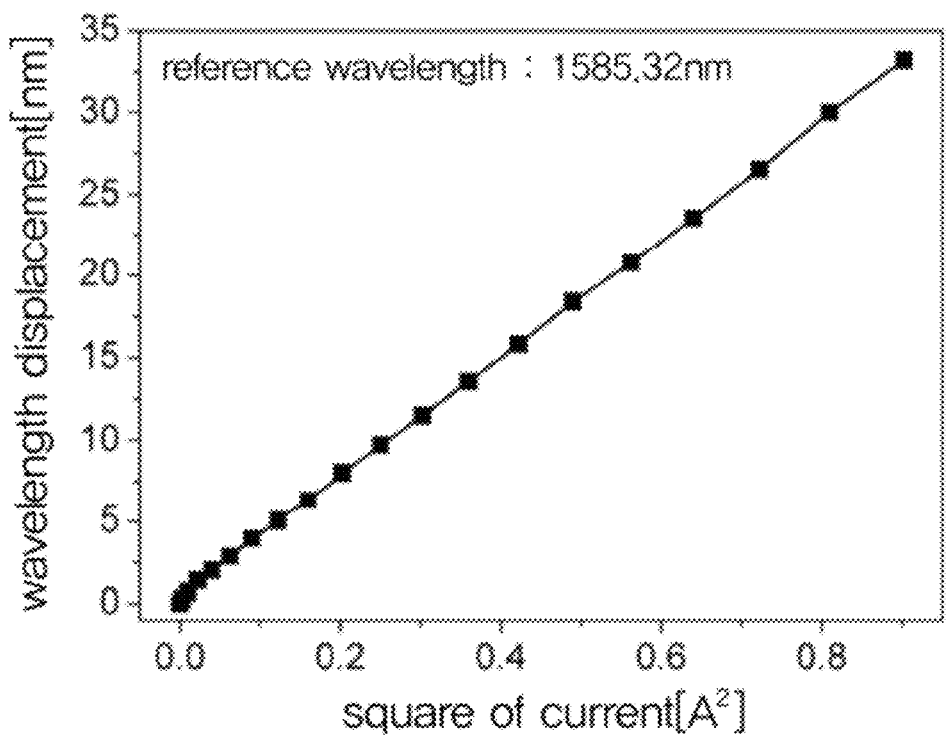
FIG. 6 is another graph showing measurement results of FIG. 5 as a wavelength displacement of the spectral dip versus the square of the applied current.

FIG. 5 is a graph showing results of measuring wavelength changes of a particular dip in the filter transmission spectrum with respect to the applied current. FIG. 6 is another graph showing measurement results of FIG. 5 as a wavelength displacement of the spectral dip versus the square of the applied current.

Specifically, FIG. 5 shows the measurement result of the wavelength shift of the spectral dip indicated by a dotted circle in FIG. 3. FIG. 6 shows the wavelength displacement of the spectral dip from a reference wavelength of 1585.32 nm (dip wavelength at 0 A) with respect to the squared value of the applied current. As can be seen from FIG. 6, the wavelength displacement of the spectral dip was substantially proportional to the square of the applied current. This is thought to be because Joule heating is roughly proportional to the square of the applied current. In FIG. 6, the wavelength shift with respect to the applied current was evaluated to be 36.79 nm/A$^2$, and a wavelength change corresponding to 1.9 times the filter wavelength interval (19.36 nm) was obtained at an applied current of 1 A.

Figure 7:
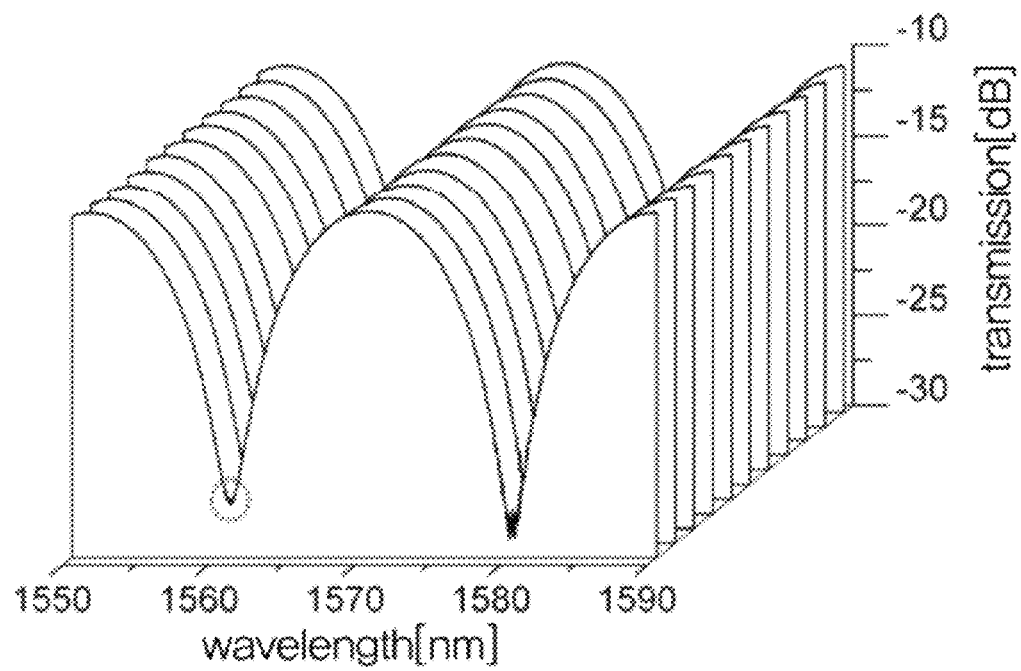
FIG. 7 is a graph showing results of measuring the transmission spectrum of the filter every three minutes for thirty minutes while the applied current was fixed at 0.4 A.
Figure 8:
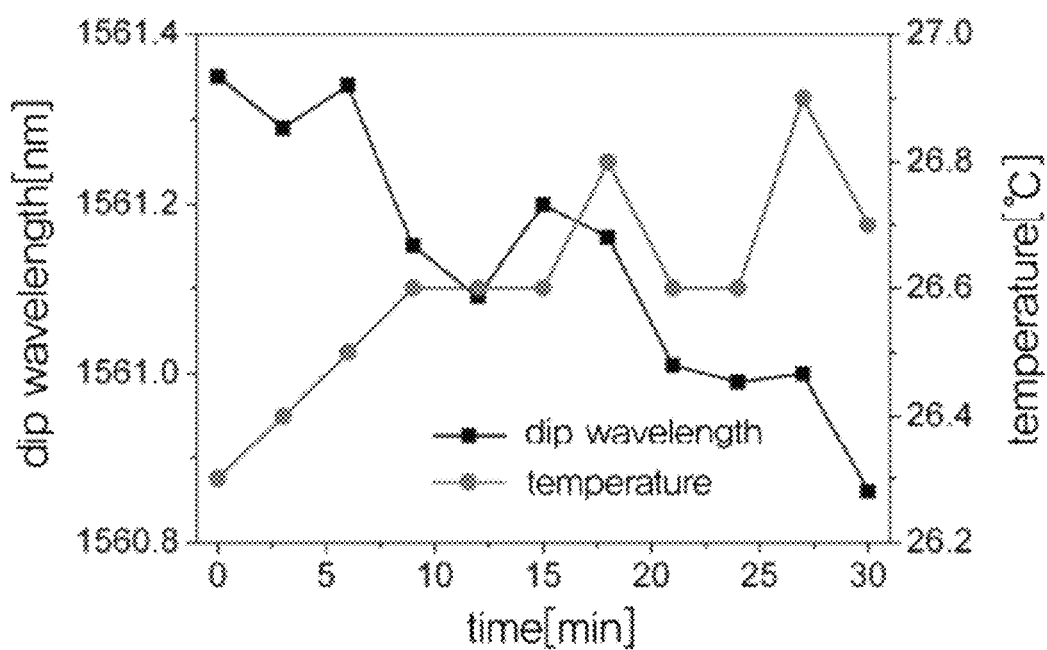
FIG. 8 is a graph showing results of measuring ambient temperature of the polarization-maintaining fiber and temporal wavelength variation of the spectral dip indicated by a dotted circle in FIG. 7.

FIG. 7 is a graph showing results of measuring the transmission spectrum of the filter every three minutes for thirty minutes while the applied current was fixed at 0.4 A. FIG. 8 is a graph showing results of measuring ambient temperature of the polarization-maintaining fiber and temporal wavelength variation of the spectral dip indicated by a dotted circle in FIG. 7.

The dip wavelength fluctuated by 0.49 nm or less for thirty minutes. This value corresponds to 2.53% of the wavelength interval of the filter. It may be inferred that this wavelength deviation of the spectral dip is generated by slight change of an equilibrium temperature around the polarization-maintaining fiber 10 due to slight change in ambient temperature caused by an external perturbation.

Exemplary embodiments are disclosed herein. However, specific structural and functional details disclosed herein are merely representative for purposes of describing exemplary embodiments, however, exemplary embodiments may be embodied in many alternate forms and should not be construed as limited to exemplary embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

In accordance with the exemplary embodiments, in the polarization-diversity loop configuration-based optical fiber multi-wavelength filter, the channel wavelength of the filter can be simply tuned by providing a coil heater in the polarization-maintaining fiber and adjusting the applied current. Therefore, the filter is more durable than filters employing a conventional method of mechanically controlling the wavelength, and it is possible to linearly tune the wavelength through a more uniform heat transfer than in a conventional method using a plate heater. Also, unlike the method of adjusting polarization, it is possible to perform wavelength tuning in a higher-order filter having sharper edge and flatter passband.

While exemplary embodiments have been disclosed herein, it should be understood that other embodiments are possible and may be obvious to one of ordinary skill in the art. Such variations are not to be regarded as a departure from the spirit and scope of the present invention, so long as they fall within the scope of the following claims.

What is claimed is:

1. An optical fiber multi-wavelength filter in which polarization-maintaining fibers are connected with optical elements in a polarization-diversity loop configuration, comprising:
a coil heater provided to the polarization-maintaining fibers,
wherein an ambient temperature of the polarization-maintaining fibers is adjusted by a current applied to the coil heater such that the wavelength of output spectrum of the optical fiber multi-wavelength filter is adjusted accordingly, and wherein the coil heater includes a coil which converts electricity into heat.

2. The optical fiber multi-wavelength filter according to claim 1, wherein the polarization-diversity loop configuration includes a polarization beam splitter and a polarization controller.

3. The optical fiber multi-wavelength filter according to claim 2, wherein the polarization controller includes a half-wave plate and a quarter-wave plate.

4. The optical fiber multi-wavelength filter according to claim 1, wherein the coil heater includes a coil which is wound several times around the polarization-maintaining fibers, and the polarization-maintaining fibers are uncovered at a portion where the coil is provided.

5. The optical fiber multi-wavelength filter according to claim 2, wherein the coil heater includes a coil which is wound several times around the polarization-maintaining fibers, and the polarization-maintaining fibers are uncovered at a portion where the coil is provided.

6. The optical fiber multi-wavelength filter according to claim 3, wherein the coil heater includes a coil which is wound several times around the polarization-maintaining fibers, and the polarization-maintaining fibers are uncovered at a portion where the coil is provided.

7. The optical fiber multi-wavelength filter according to claim 4, wherein the coil is composed of materials including at least one of, but not limited to, nickel (Ni), chrome (Cr), carbon (C), quartz (SiO2), stainless steel, TEFLON®, titanium (Ti), copper (Cu), iron (Fe), aluminum (Al), zinc (Zn), brass (Bs), mica, and alloys thereof.

8. The optical fiber multi-wavelength filter according to claim 5, wherein the coil is composed of materials including at least one of, but not limited to, nickel (Ni), chrome (Cr), carbon (C), quartz (SiO2), stainless steel, Teflon®, titanium (Ti), copper (Cu), iron (Fe), aluminum (Al), zinc (Zn), brass (Bs), mica, and alloys thereof.

9. The optical fiber multi-wavelength filter according to claim 6, wherein the coil is composed of materials including at least one of, but not limited to, nickel (Ni), chrome (Cr), carbon (C), quartz (SiO2), stainless steel, TEFLON®, titanium (Ti), copper (Cu), iron (Fe), aluminum (Al), zinc (Zn), brass (Bs), mica, and alloys thereof.

10. The optical fiber multi-wavelength filter according to claim 1, wherein the polarization-maintaining fibers comprise at least one of a bow tie type polarization-maintaining fiber, a panda type polarization-maintaining fiber, an elliptical core type polarization-maintaining fiber, an elliptical cladding type polarization-maintaining fiber, or a polarization-maintaining photonic-crystal fiber.

11. The optical fiber multi-wavelength filter according to claim 2, wherein the polarization-maintaining fibers comprise at least one of a bow tie type polarization-maintaining fiber, a panda type polarization-maintaining fiber, an elliptical core type polarization-maintaining fiber, an elliptical cladding type polarization-maintaining fiber, or a polarization-maintaining photonic-crystal fiber.

12. The optical fiber multi-wavelength filter according to claim 3, wherein the polarization-maintaining fibers comprise at least one of a bow tie type polarization-maintaining fiber, a panda type polarization-maintaining fiber, an elliptical core type polarization-maintaining fiber, an elliptical cladding type polarization-maintaining fiber, or a polarization-maintaining photonic-crystal fiber.

13. A method of controlling a wavelength of a filter output spectrum using an optical fiber multi-wavelength filter including polarization-maintaining fibers and a coil heater provided to the polarization-maintaining fibers, comprising:
tuning a wavelength of a filter output spectrum by adjusting an ambient temperature of the polarization-maintaining fibers through adjustment of a current applied to the coil heater such that the wavelength of output spectrum of the optical fiber multi-wavelength filter is adjusted accordingly, wherein the coil heater includes a coil which converts electricity into heat.

14. The method according to claim 13, wherein polarization-maintaining fibers are connected with optical elements in a polarization-diversity loop configuration.

15. The method according to claim 13, wherein the coil heater is configured to include a coil wound several times around the polarization-maintaining fibers, and the polarization-maintaining fibers are uncovered at a portion where the coil is provided.

16. The method according to claim 13, wherein the ambient temperature around the polarization-maintaining fibers is controlled such that the birefringence of the polarization-maintaining fibers is adjusted to continuously tune a peak or dip wavelength of the filter output spectrum.

17. The method according to claim 14, wherein the ambient temperature around the polarization-maintaining fibers is controlled such that the birefringence of the polarization-maintaining fibers is adjusted to continuously tune a peak or dip wavelength of the filter output spectrum.

18. The method according to claim 15, wherein the ambient temperature around the polarization-maintaining fibers is controlled such that the birefringence of the polarization-maintaining fibers is adjusted to continuously tune a peak or dip wavelength of the filter output spectrum.

* * * * *